S. E. OVIATT.
Thrashing Machine.

No. 84,705.

Patented Dec. 8, 1868.

Witnesses:
J. H. Burnelye
Frank S. Alden

Inventor:
S. E. Oviatt

S. E. OVIATT, OF RICHFIELD, OHIO.

*Letters Patent No. 84,705, dated December 8, 1868.*

IMPROVEMENT IN GRAIN-SEPARATORS.

The Schedule referred to in these Letters Patent and making part of the same.

*To all whom it may concern:*

Be it known that I, S. E. OVIATT, of Richfield, in the county of Summit, and State of Ohio, have invented certain new and useful Improvements in Grain-Separators; and I do hereby declare that the following is a full and complete description of the same, reference being had to the accompanying drawings, making part of this specification, in which—

Figure 1:
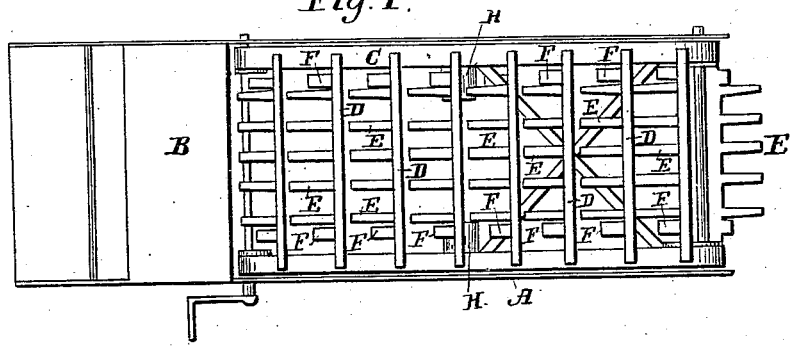
Figure 2:
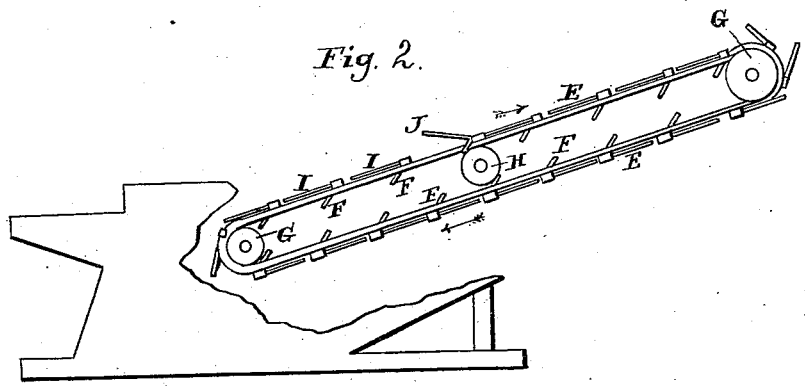
Figure 3:
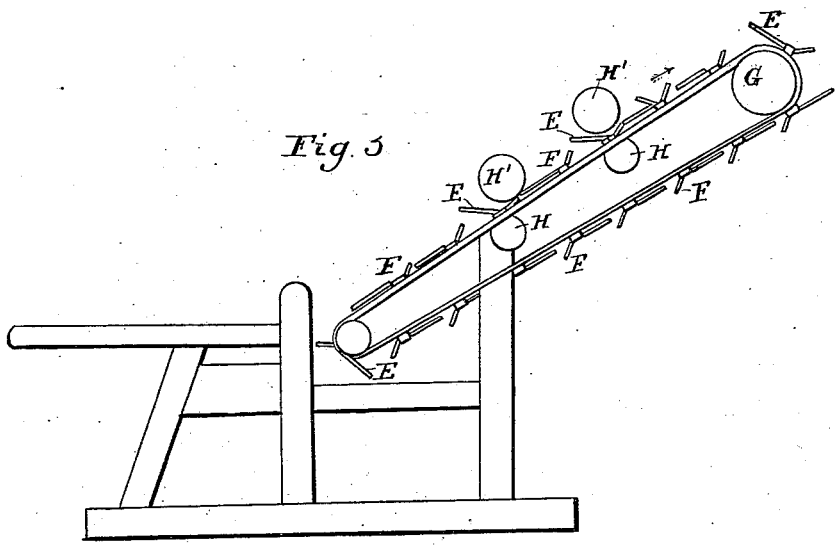

Figure 1 is a top view of the grain-separator.
Figure 2 is a side view.
Figure 3, a view to be referred to.

Like letters refer to like parts in the different views presented.

My invention relates to an improved mode of conveying the straw from the thresher to the stack, and agitating the same, so as to separate the grain therefrom while it is thus being conveyed, a description of which is as follows:

A represents the frame-work, which may be of any form desired, suitable for the purpose, and in which is arranged a cylinder at B for threshing out the grain.

C is a revolving apron or carrier.

To this are attached the cross-bars D, to which are connected the fingers E, as shown.

Also attached near the end of the cross-bar are the arms F, placed at an angle with the fingers E, as shown in fig. 2.

Placed between the rollers G, on which the apron revolves, are the rollers H, as shown in fig. 2, which may be more or less in number, as desired, and are for the purpose of raising the fingers E, by means of the arm F, which strikes against them, and being at an angle with the fingers, they are raised in its passage over the roller, and fall back in place again after the tooth has passed.

Thus, when the grain is threshed, and thrown by the cylinder on the carrier C, the straw is carried away, and the grain dropped between the fingers, and the teeth F, in passing over rollers H, by raising the fingers, agitate the straw and keep it in continual motion, thus sifting the grain through, and leaving little or none to be carried off with the straw.

When the grain is thrown upon the carriers from the cylinders, the fingers are in the position shown at I, and when passing over the rollers H, they are raised to the position shown at J by the arms F. This tosses up the straw, which allows the grain to fall through on the lower apron or inclined plane, and the return of the carrier takes it to the screens.

Another mode of giving the motion to the straw is by arranging the arm F on the upper side of the cross-bar, and rollers H, also above, as shown in fig. 3. This also agitates the straw, and allows the grain to drop through in the same manner as before described.

There may be one roller in the middle, in place of one on each side, as shown.

What I claim as my improvement, and desire to secure by Letters Patent, is—

1. The finger-bar D and conveyer C, in combination with the roller H or its equivalent, to operate substantially as set forth, for the purpose specified.

2. So hanging the finger-bar D of the conveyer to the endless belt, chain, or apron, as to allow the said finger-bar to receive a turning or tipping motion, to throw or agitate the straw when it is being conveyed from the threshing-cylinder, substantially as and for the purpose described.

S. E. OVIATT.

Witnesses:
W. H. BURRIDGE,
E. E. WAITE.